(12) United States Patent
Reed

(10) Patent No.: US 6,257,637 B1
(45) Date of Patent: Jul. 10, 2001

(54) REMOVABLE TAILGATE EXTENDER NET

(76) Inventor: Wendal T. Reed, 42304 Willeta Dr., Quartz Hill, CA (US) 93536-3751

( * ) Notice: Subject to any disclaimer, the term of this patent is extended or adjusted under 35 U.S.C. 154(b) by 0 days.

(21) Appl. No.: 09/686,750

(22) Filed: Oct. 10, 2000

Related U.S. Application Data

(60) Provisional application No. 60/159,731, filed on Oct. 15, 1999.

(51) Int. Cl.[7] .................................................. B62D 33/02
(52) U.S. Cl. ..................................... 296/26.08; 296/57.1
(58) Field of Search ............................ 296/26.08, 57.1

(56) References Cited

U.S. PATENT DOCUMENTS 5,997,066 * 12/2000 Scott ................................. 296/26.08
6,155,622 * 12/2000 Reed ................................. 296/26.08

* cited by examiner

Primary Examiner—Joseph D. Pape
(74) Attorney, Agent, or Firm—Beehler & Pavitt

(57) ABSTRACT

An improved net for the tailgate section of a pickup truck includes spaced side frames attached to the side wall of the truck and to the end of the tailgate in the open or lowered position. The side frames support an open net unit having a pair of side sections and a rear section attached to the side sections. The side sections are supported by spaced vertical support members which are pivotally attached to a horizontal support member. The support members are easily folded into a compact profile for easy storage and the net assembly is easy to install and to remove and store.

20 Claims, 4 Drawing Sheets

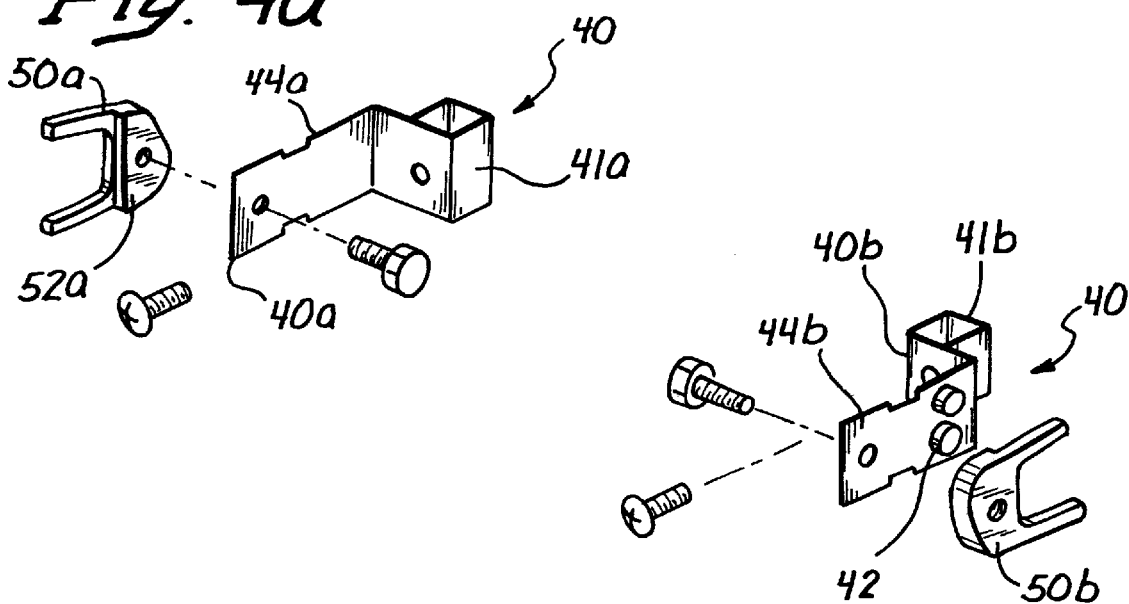
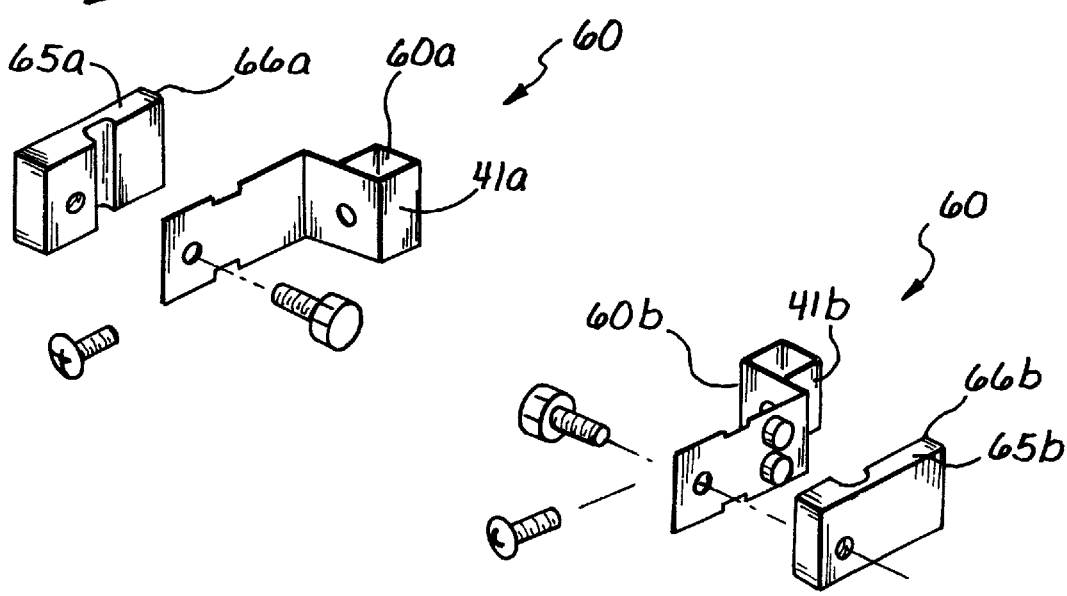

REMOVABLE TAILGATE EXTENDER NET

This application claims benefit of Provisional application Ser. No. 60/159,731 filled Oct. 15, 1999.

FILED OF INVENTION

This invention relates to nets for the tailgate section of pickup trucks and more particularly to an improved easily assembled and disassembled and installed and removed tailgate extender net for universal use on various models of pickup trucks and for use when the tailgate is in a lowered or opened position to protect the articles in the truck bed from being expelled or falling off the truck bed and to permit placement of articles longer than the bed in the back of the truck.

BACKGROUD OF THE INVENTION

Pickup trucks are frequently used to transport various types of cargo. If the cargo is too long to fit on the truck bed, the tailgate at the rear of the bed can be left opened or removed during cargo transportation. With the tailgate lowered or in the open position or removed, however, there is the danger that articles carried in the truck bed may fall off and become lost.

It is quite common for motorsports enthusiasts to drive and ride with the tailgate down. For example, they may be transporting items such as motorcycles, ATV's personal watercraft and/or other items such as protective gear, apparel, gas cans, water, supplies, tools, spare parts, luggage, camping equipment and the like. In some cases what is being carried in the back of the pickup truck may be of different sizes, e.g., a motorcycle and protective gear. With an open back end of the truck bed, these smaller items may be lost since the larger items are usually tied down in place. In some cases, small bed pickup trucks, including many extended cab models, are not long enough to handle the length of off road vehicles with the tailgate closed, so the tailgate is left open or down.

The need to use the tailgate still attached to the vehicle, but in an open or down position, has created the need for some form of tailgate net. In some cases, the tailgate has been removed and a net installed across the back of the bed and hooked to the side. The trouble with this arrangement is that the items to be transported cannot be longer than the length of the truck bed.

In addition to a tailgate net, it is also desirable and important that the net be easily installed, removed and stored; that the net be flexible so as to deform locally to accommodate items of different size and shape. It is also important that the net permit access to the truck bed without the necessity of removing the entire net structure from the truck. Reduced cost is also a factor as well as easy storage in a relatively small space.

DESCRIPTION OF THE PRIOR ART

A variety of truck bed extenders are known in the art. For example, U.S. Pat. No. 5,823,506 of Oct. 20,1998 uses the existing hardware on the truck side wall and tailgate to attach a solid fence device to the truck with the tailgate in the down position. This particular device has the disadvantage of solid side walls and a solid rear wall which extend upwardly from the truck bed. It requires a long storage area, at least as wide as the truck bed, Thus, items must either be lifted above and over the fence or the fence may be removed and then reinstalled. This may occur, for example, when loading a motorcycle.

U.S. Pat. No. 5,700,047 of Dec. 23, 1997 describes a truck bed extender which is made of rigid material and which can be removed as a unit and stored or rotated to a position such that the extender remains attached but is positioned in the truck bed. In either case, it is required that items be lifted over the extender if the latter is attached to the truck.

It is thus an object of the present invention to provide an improved tailgate net assembly which is easy to install and to remove and which can be stored in a relatively small space.

Another object of the invention is the provision of an improved frame member for use with a truck extender net in which the frame is foldable to a storage condition and when installed provides support for the net.

Still a further object of the invention is the provision of a net assembly for a pick-up truck which may be easily installed and removed and which may be easily stored.

BRIEF DESCRIPTION OF THE INVENTION

The above and other objects of this invention are achieved by an improved net assembly adapted to be mounted on the rear end of a pick-up truck in which the tailgate is in the down or open position.

The net assembly includes two spaced frames, which can be unfolded and installed on each side of the truck and affixed at one end to the truck side wall and at the other end to the truck tailgate. The frames when installed are generally U-shaped and each includes a forward and rear vertical support and a horizontal support hingedly affixed to each of the vertical supports and resting on the truck tailgate. This effectively makes the lowered tailgate a part of the truck bed. The hinges are unique and allow the frames to be folded into a tight package which is essentially three times the thickness of each of the component of the net assembly, excluding the net itself.

The vertical frame member to be affixes to the rear of the truck side wall carries a slidable catch mounting device which may take the form of one of two types, as will be described. The rear end of the horizontal support has affixed thereto a support plate resting on the tailgate and which carries an eye bolt for affixing the net support structure to the open truck bed, along the side of the same and to the tailgate latch post.

The lower end of the front vertical support includes a unique hinge mechanism which supports that support in a vertical position and which is foldable by rotating it 270° in order to fold the side frame elements when not in use.

Attached to one of the side frames is a side net and a rear net, the other side frame carrying only a side net. The side nets are affixed at one end to the forward vertical support and at the other end to the rear vertical support. The side nets are deliberately supported at an angle with the support frames being outboard of the side nets to prevent contact between items being carried and the vertical frame members. The rear net extends between the rear vertical supports.

Assembly is relatively simple and generally includes opening the tailgate, unfolding the side frames, affixing each side frame to the side wall of the vehicle and the side of the tailgate, with the frame carrying the longer section of net being positioned on the passenger side. The other frame is mounted on the driver side and is mounted on the side wall of the truck and on the tailgate. The rear net may then be releasably hooked to side nets and installation is basically complete. Removal involves just the reverse and the frames may be folded into a small compact profile which is basically three times the thickness of the tubes and essentially the length of the horizontal frame, although the vertical frames are slightly shorter. The flexible net does not take up much space and remain attached to the frames when the assembly is removed and stored.

This invention has many other advantages, and other objectives, which may be more clearly apparent from consideration of the various forms in which it may be embodied. Certain versions of such forms are shown in the drawings accompanying and forming a part of the present specification. These forms will now be described in detail for the purpose of illustrating the general principles of the invention; but it is understood that such detailed description is not to be taken in a limiting sense.

DESCRIPTION OF THE DRAWINGS

FIGS. 4a and 4b are developed views of one form of mounting latch showing the left and right latch;

FIGS. 5a and 5b are developed views of another mounting latch showing the left and right latch.

DETAILED DESCRIPTION OF THE INVENTION

Figure 1:
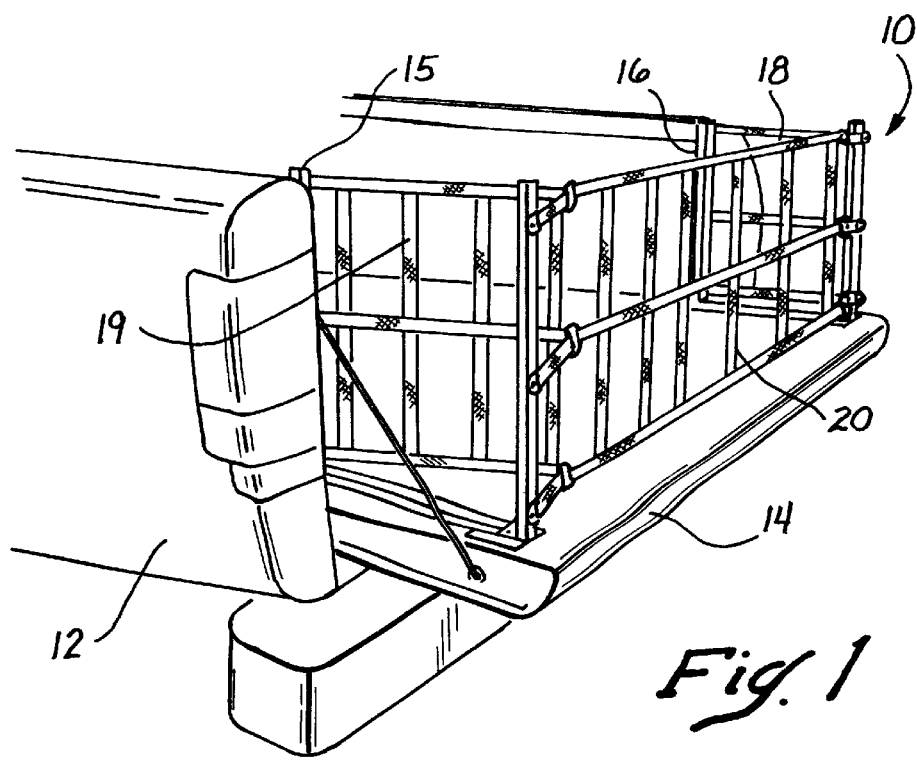
FIG. 1 is a view in perspective of the net of this invention installed on a truck with the tailgate in the lowered position.

Referring to the drawings which illustrate a preferred form of the present invention, FIG. 1 shows the tailgate net assembly 10 of this invention as assembled on a truck 12 with the tailgate 14 in a lowered or down position. The net assembly is supported by the tailgate and affixed at one end to the tailgate and at the other end to the side walls of the truck.

Figure 2:
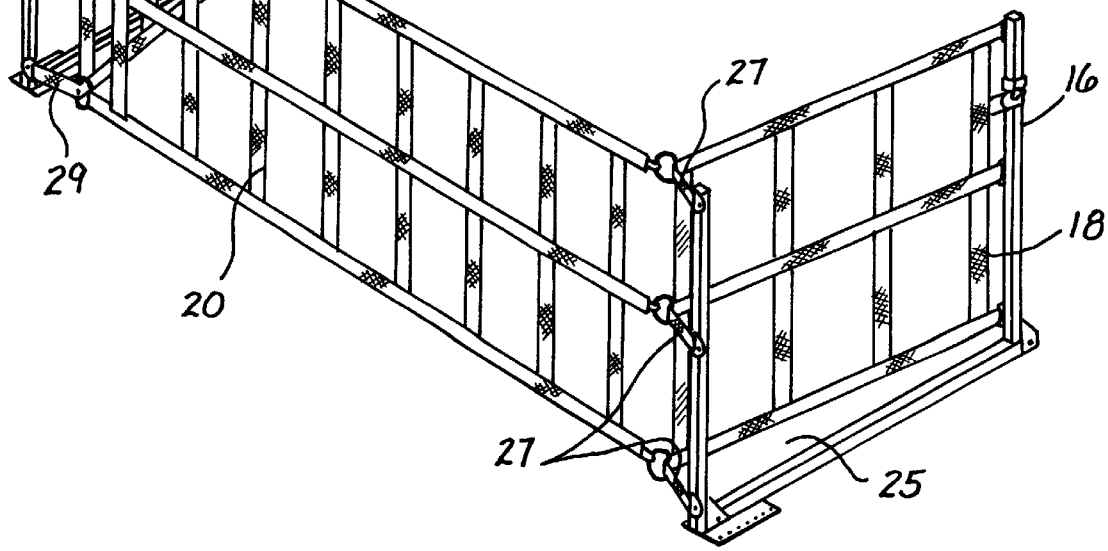
FIG. 2 is a perspective view of the net of this invention showing the frame and net itself.

As seen in FIG. 2, the net assembly 10 includes left and right support frames 15 and 16 each of which is generally u-shaped when unfolded and installed. These support frames are made of metal or other material having considerable strength to support the attached net, as will be described. Supported by the left and right support frames are rearwardly extending side net sections 18 and 19, supported by the right and left support frames, as shown. Each side net section 18 and 19 includes short net panels, to be described, in order to permit the side walls to be stretched away from the supports. Thus the assembled net is not quite square in configuration.

Extending between the side net sections 18 and 19 and essentially across the rear end of the truck bed is the rear net section 20, which is the form shown is secured to the right net section by D-rings, as will be described, and to the left net section 19 by releasable hooks 22 which engage D-rings on the left net section. As shown, the net side sections 18 and 19 and the rear section 20 are all in the form of flexible netting having vertical and horizontal straps as shown. The rear net 20 extends across the major portion of the width of the tailgate.

As seen in FIG. 2, each side net is mounted at an angle with respect to the associated frame such that there is a space 25 between the frame and the associated side section. This angular orientation is achieved by short strap sections 27 and 29 connected to the associated frame and the associated side net. The result is that the net is spaced from each side support and the rear net section is slightly shorter than the width of the truck bed. The side walls of the side nets are not in parallel relation, which the supports 15 and 16 are in a parallel relation. One advantage of this arrangement is that it keeps items in the truck bed from contacting the frame members directly.

Figure 3:
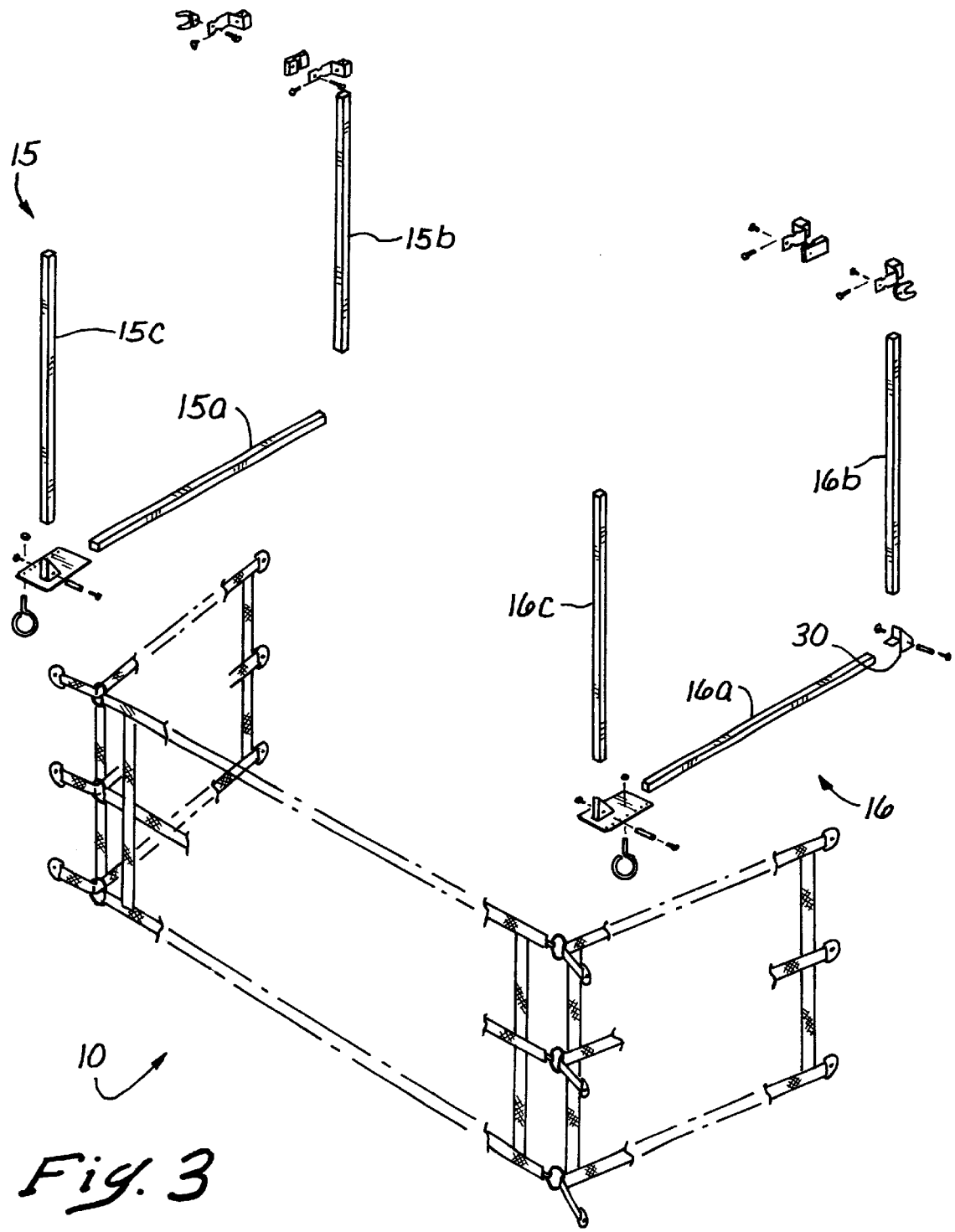
FIG. 3 is a developed view of the net and support elements in accordance with this invention.

Referring now to FIG. 3, the net assembly 10 is shown in a developed view with each of the parts thereof displayed. The left and right support frames 15 and 16 include a horizontal member 15a and 16a connected at one end to a forward vertical member 15b and 16b and at the other end to a rear vertical member 15c and 16c. Each of the front, rear vertical members and associated horizontal member of each of the left and right support frames is separate and each is made of square or rectangular steel tubing for strength.

Figure 3A:
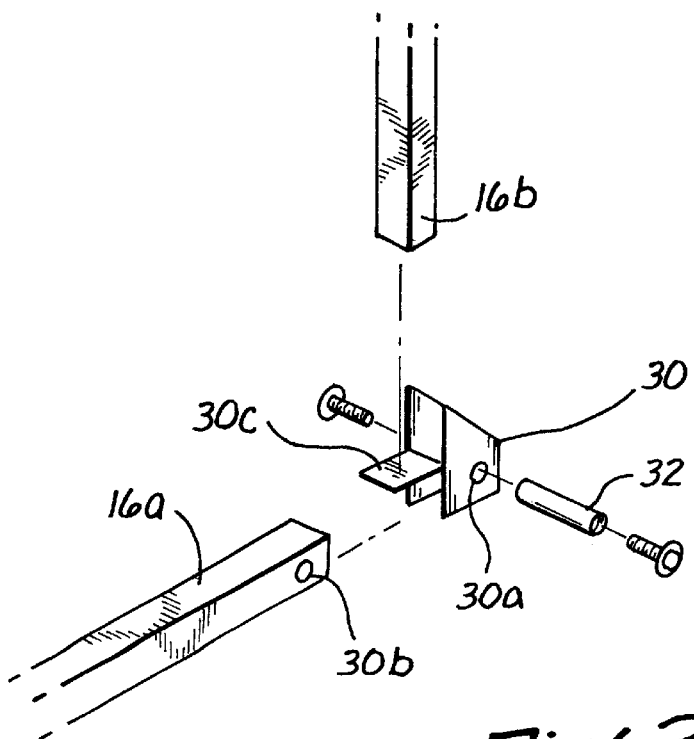
FIG. 3a is an enlarged view of the self squaring hinge of this invention.

One aspect of this invention, a feature which permits easy assembly, disassembly and storage is the construction and operation of the left and right support frames 15 and 16. Referring to FIGS. 3 and 3a, the rear vertical frames 15a and 16a are joined to the horizontal frames 15a and 15a, respectively, by a hinge 30 which is fixedly attached to the bottom of the vertical frames 15b and 16b as by welding and the like. The hinge 30 is also pivotally mounted on the horizontal members 15a and 16a by a nut and bolt and sleeve 32 which passes through the hinge and an aperture 30a in the hinge and an aperture 30b in the horizontal member 15a and 16a. As seen in FIG. 3a, each hinge 30 includes an integral tab 30c which forms a seat for the horizontal member 15b and 16b, the tab resting on the end of the horizontal support 16a and 15a in the assembled position.

FIG. 3a also illustrates the manner in which the side frames 15 and 16 may be folded into a small space for storage, even with the nets attached. As seen in this Figure, the vertical support 16b (and 15b) can be rotated 270° in the direction indicated by the arrow so that it folds under the horizontal support. The forward vertical support can then be rotated 90° so as to rest on the top surface of the horizontal support. In this condition, the front vertical frame is shorter than both the horizontal and rear vertical frame and the rear vertical frame is shorter than the horizontal frame and longer than the front vertical frame. Accordingly, when folded the side support structures have a dimension which is the width of the tubing, the length of the tubing and three times the thickness of the tubing. Such a compact condition makes the net assembly of this invention easy to store and may easily be place behind the driver or passenger seat of the truck.

As seen in FIG. 1, the net supporting structure is mounted on the sidewall of the truck, with the truck tailgate lowered or in the open position, and on the end of the truck tailgate. This mounting is achieved by one form of mounting latch clamp unit 40 as shown in FIGS. 4a and 4b which illustrate the left and right assemblies 40a and 40b. This form of mounting assembly is bolted to the top of the vertical supports 15b and 16b and function to secure each of these vertical supports to the associated side wall of the truck. Each of the clamps includes a bracket 41a and 41b which is slidably affixed to the top end of the vertical support member 15a and 16b. Each bracket includes index pins 42 facing away from the associated support, the pins being located on an offset 44a and 44b. Cooperating with each bracket is a u-shaped latch plate 50a and 50b to be received in the knob-like latch clamp on the rear face of the side wall of the truck. As seen in 50*a*, a shoulder 52*a* is provided in each plate so that it can be assembled over the knob and secured in place with a thumb screw, as shown, the pins bearing against the shoulder to prevent rotation of the latch plate.

In order to provide for universal mounting, the net assembly as sold also includes a second form of mounting assembly 60 as shown in FIGS. 5*a* and 5*b* which illustrate the left and right units 60*a* and 60*b*. Each includes basically the same brackets 41*a* and 41*b* as already described, each slidably affixed to one of the vertical supports 15*a* and 15*b*. In this case each of the left and right units include box catch 65*a* and 65*b*, each having an insert finger 66*a* and 66*b* which is inserted into the latch point on the rear side wall of the truck where an apertured box catch is used.

Figure 6A:
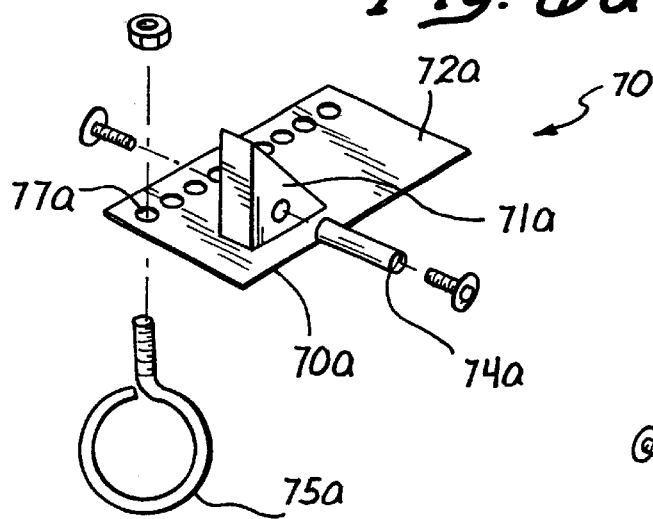
FIGS. 6a and 6b are exploded views of the universal mount base plate in accordance with this invention.
Figure 6B:
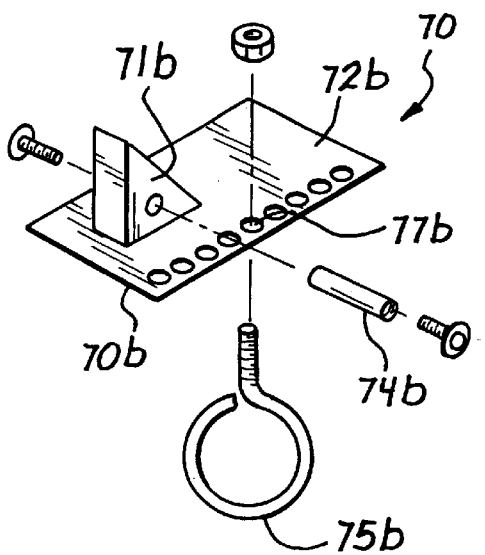

To mount the support frames on the side of the open tailgate, the frame assembly includes a universal base plate and hinge unit 70*a* and 70*b* as seen in FIGS. 6*a* and 6*b*. Each plate includes an upstanding hinge 71*a* and 71*b* which is preferably welded to a plate 72*a* and 72*b*. Vertical supports 15*c* and 16*c* are fixedly received in the hinges, as by welding the plate to the bottom of the vertical support. The rear end of the horizontal members 15*a* and 16*a* are mounted in the respective bracket by the nut and bolt and sleeve units 74*a* and 74*b*. Also associated with each plate and hinge is an eye bolt 75*a* and 75*b* which is received in one of the apertures 77*a* and 77*b* which are provided on the plates and on the outboard side. In use, the eyebolts are secured to the plate by a nut and the tailgate latch post passes through the eye bolt to secure the rear and lower end of the support frame to the truck tailgate. To permit adjustment, each plate includes the spaced apertures extending axially of the length of the truck, as described.

It should be understood that this invention is not limited to the detailed descriptions set forth herein which describe in detail preferred forms of the present invention. Modifications thereof will be apparent to those skilled in the art, based on the above detailed disclosure, but such modifications based on this disclosure may not be deemed to depart from the spirit and scope of the present invention as set forth in the appended claims.

What is claimed is:

1. An improved net assembly for the bed and tailgate section of a pickup truck wherein the truck has side walls and a tailgate movable between an open and a closed position, the improvement comprising:

a net unit having spaced side sections and a rear section joined to said side sections for use with the tailgate in the open position, said side sections each having one end attachable to the rear section, frame members including left and right frames, each of the left and right frames including a front and rear vertical frame member and a horizontal frame member between the vertical frame members, one of said vertical frame members of each of the left and right frames being attachable to the side wall of the truck and the other vertical frame member being attachable to the side of the tailgate in the lowered or open position, one end of each side section of the net being attached to the vertical frame attached to the sidewall of the truck and the other end thereof being attached to the rear net section, and side strap sections attached at one end to the rear net section and at the other end to the other vertical frame member.

2. An improved net assembly as set forth in claim 1 wherein said net unit is composed of flexible net material.

3. An improved net assembly as set forth in claim 1 wherein the vertical and horizontal frame members are foldable relative to each other such that the frame members overlie each other.

4. An improved net assembly as set forth in claim 2 wherein said flexible net material is flexible netting material.

5. An improved net assembly as set forth in claim 1 wherein hinge means interconnect each of the vertical frame elements to the horizontal frame elements.

6. An improved net assembly as set forth in claim 1 wherein said frame members are composed of tubular metal elements.

7. An improved net assembly as set forth in claim 1 wherein said horizontal frame members are disposed in spaced parallel relation.

8. An improved net assembly as set forth in claim 1 wherein said side sections of said net are disposed at an angular relative to each other.

9. A collapsible and improved net assembly for the bed and tailgate section of a pickup truck wherein the truck has side walls and a tailgate movable between an open and a closed position, the improvement comprising:

a net unit having spaced side sections and a rear section removably attached to said side sections for use with the tailgate in the open position, said side sections each having one end attachable to the rear section, frame members including left and right frames, each of the left and right frames including a front and a rear vertical frame member and a horizontal frame member between the vertical frame members, the front vertical frame member of each of the left and right frames being attachable to the side wall of the truck and the rear vertical frame member of each of the left and right frames being attachable to the side of the tailgate in the lowered or open position, one end of each side section of the net being attached to the front vertical frame attached to the sidewall of the truck and the other end thereof being attached to the rear net section, and side strap sections attached at one end to the rear net section and at the other end to the other vertical frame member.

10. A collapsible and improved net assembly for the bed and tailgate section of a pickup truck as set forth in claim 9 wherein said horizontal frame members are mounted in nonparallel relation.

11. A collapsible and improved net assembly for the bed and tailgate section of a pickup truck as set forth in claim 9 wherein said side sections of said net unit are spaced from the associated horizontal frame member.

12. A collapsible and improved net assembly for the bed and tailgate section of a pickup truck as set forth in claim 9 wherein the front frame member is shorter than each of the horizontal and rear vertical frame members.

13. A collapsible and improved net assembly for the bed and tailgate section of a pickup truck as set forth in claim 9 wherein hinge means are mounted at the front and rear end or each horizontal frame member.

14. A collapsible and improved net assembly for the bed and tailgate section of a pickup truck as set forth in claim 13 wherein the front vertical frame member is foldable under the horizontal frame member.

15. A collapsible and improved net assembly for the bed and tailgate section of a pickup truck as set forth in claim 14 wherein the rear horizontal vertical frame member is foldable over the horizontal frame member.

16. A collapsible and improved net assembly for the bed and tailgate section of a pickup truck as set forth in claim 15 wherein the front vertical frame member is rotatable 270 degrees to rest under the horizontal frame member while the rear vertical frame member is rotatable 90 degrees to rest on the top of the horizontal frame member.

17. A collapsible and improved net assembly for the bed and tailgate section of a pickup truck as set forth in claim 13 wherein said hinge means is fixedly mounted on said front vertical support elements.

18. A collapsible and improved net assembly for the bed and tailgate section of a pickup truck as set forth in claim 17 wherein said hinge means pivots on the horizontal support element.

19. A collapsible and improved net assembly for the bed and tailgate section of a pickup truck as set forth in claim 9 wherein said net unit is composed of flexible strapping.

20. An improved net assembly for the bed and tailgate section of a pickup truck which is relatively easy to install and to remove and wherein said truck has sidewall and a tailgate movable between an open and a closed position, the improvement comprising:

a flexible net unit having spaced side sections and a rear section joined to said side sections for use with the tailgate in the open position, said side sections each having one end attachable to the rear section, tubular metal frame members including left and right frames, each of the left and right frames including a front and rear vertical frame member and a horizontal frame member between the vertical frame members, the front vertical frame members of each of the left and right frames being attachable to the side wall of the truck and the rear vertical frame member of the left and right frames being attachable to the side of the tailgate in the lowered or open position, the front vertical frame being shorter than each of the associated horizontal and rear vertical frames, one end of each side section of the net being attached to the vertical frame attached to the sidewall of the truck and the other end thereof being attached to the rear net section, and side strap sections attached at one end to the rear net section and at the other end to the rear vertical frame member.

\* \* \* \* \*